(12) United States Patent
Cumbers

(10) Patent No.: US 7,175,528 B1
(45) Date of Patent: *Feb. 13, 2007

(54) PASSIVE BIOMETRIC CUSTOMER IDENTIFICATION AND TRACKING SYSTEM

(75) Inventor: Blake Cumbers, Henderson, NV (US)

(73) Assignee: Biometric Recognition, LLC, Henderson, NV (US)

( * ) Notice: Subject to any disclaimer, the term of this patent is extended or adjusted under 35 U.S.C. 154(b) by 635 days.

This patent is subject to a terminal disclaimer.

(21) Appl. No.: 10/357,832

(22) Filed: Feb. 4, 2003

Related U.S. Application Data

(63) Continuation-in-part of application No. 10/080,829, filed on Feb. 22, 2002, now Pat. No. 6,783,459, which is a continuation-in-part of application No. 09/707,439, filed on Nov. 6, 2000, now Pat. No. 6,554,705, which is a continuation-in-part of application No. 09/588,791, filed on Jun. 6, 2000, now Pat. No. 6,234,900, which is a continuation-in-part of application No. 08/916,270, filed on Aug. 22, 1997, now Pat. No. 6,142,876.

(51) Int. Cl.
*A63F 9/24* (2006.01)

(52) U.S. Cl. .............. 463/29; 463/16; 463/25; 463/42; 235/380; 273/309; 382/118; 713/186

(58) Field of Classification Search ........... 463/16–20, 463/25–26, 29, 39–42, 46–47; 700/91–93; 273/293, 143 R, 309; 235/375, 380, 382; 705/14, 16–18; 340/825.36, 5.2, 5.52, 5.82–5.84; 382/115, 117–118; 713/182, 186

See application file for complete search history.

(56) References Cited

U.S. PATENT DOCUMENTS

| | | | |
|---|---|---|---|
| 4,710,873 A | 12/1987 | Breslow et al. | |
| 4,821,118 A | 4/1989 | Lafreniere | |
| 5,012,522 A | 4/1991 | Lambert | |
| 5,179,517 A | 1/1993 | Sarbin et al. | |
| 5,229,764 A * | 7/1993 | Matchett et al. | ........... 340/5.52 |
| 5,258,837 A | 11/1993 | Gormley | |
| 5,283,644 A | 2/1994 | Maeno | |

(Continued)

OTHER PUBLICATIONS

True Face Access system, 9 page brochure by MIROS INC, circa unknown.

*Primary Examiner*—Mark Sager
(74) *Attorney, Agent, or Firm*—Rob L. Phillips; Greenberg Traurig

(57) ABSTRACT

A computer-based customer tracking system passively identifies customers. Acquired biometric identification information is sent to a computer processor, which searches files in a library for matching biometric data. If no match is found, the processor opens a new file in the library. If a match is found, said processor stores in the file that a repeat identification has occurred. If said processor is only able to reduce the number of possible matches to two or more files, personnel determines if a match certain has occurred. If prior activity information stored in the file exceeds a predetermined level, the prior activity information is retrieved from the file and sent to a terminal, preferably at the location of the transaction. New information from the transaction is stored for future access. A selected or assigned personal identification number (PIN) reduces the time associated with, and improves the efficiency of, the identification process.

36 Claims, 5 Drawing Sheets

U.S. PATENT DOCUMENTS

| | | | |
|---|---|---|---|
| 5,291,560 A * | 3/1994 | Daugman | 382/117 |
| 5,386,103 A | 1/1995 | DeBan et al. | |
| 5,432,864 A | 7/1995 | Lu et al. | |
| 5,530,438 A | 6/1996 | Bickham et al. | |
| 5,553,864 A | 9/1996 | Sitrick | |
| 5,580,308 A | 12/1996 | Nakamura | |
| 5,594,806 A | 1/1997 | Colbert | |
| 5,595,389 A | 1/1997 | Parulski et al. | |
| 5,613,912 A | 3/1997 | Slater | |
| 5,657,389 A * | 8/1997 | Houvener | 713/186 |
| 5,768,382 A * | 6/1998 | Schneier et al. | 380/251 |
| 5,770,533 A * | 6/1998 | Franchi | 463/42 |
| 5,810,665 A * | 9/1998 | Takemoto et al. | 463/31 |
| 5,901,238 A | 5/1999 | Matsushita | |
| 5,941,774 A | 8/1999 | Takemoto et al. | |
| 5,984,780 A | 11/1999 | Takemoto et al. | |
| 6,142,876 A | 11/2000 | Cumbers | |
| 6,234,900 B1 | 5/2001 | Cumbers | |
| 6,554,705 B1 * | 4/2003 | Cumbers | 463/29 |
| 6,612,928 B1 * | 9/2003 | Bradford et al. | 463/29 |
| 6,641,484 B2 * | 11/2003 | Oles et al. | 463/47 |
| 6,783,459 B2 * | 8/2004 | Cumbers | 463/29 |
| 6,905,411 B2 * | 6/2005 | Nguyen et al. | 463/25 |
| 2002/0111210 A1 * | 8/2002 | Luciano et al. | 463/29 |

* cited by examiner

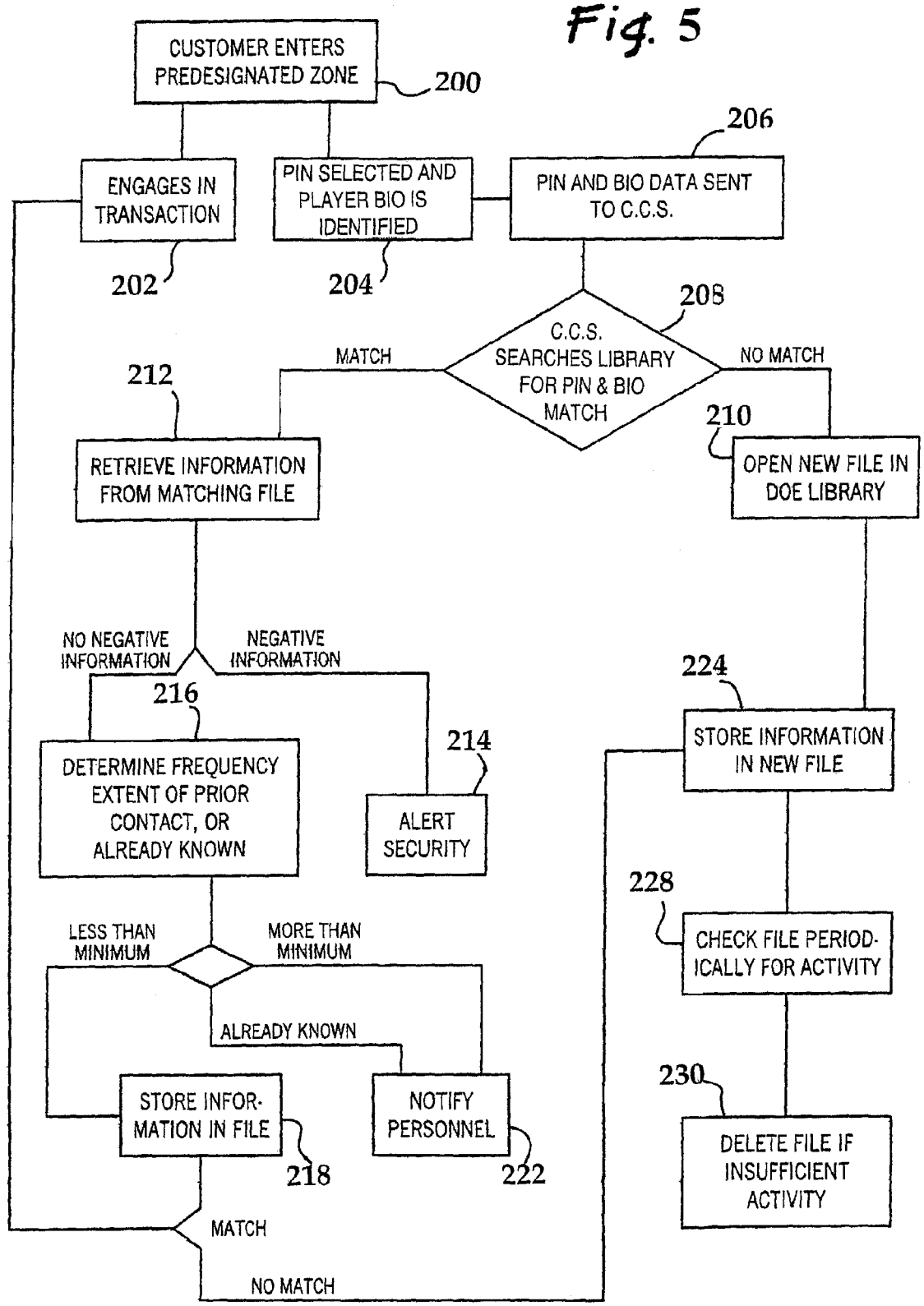

PASSIVE BIOMETRIC CUSTOMER IDENTIFICATION AND TRACKING SYSTEM

CROSS REFERENCE TO RELATED APPLICATIONS

This application is a continuation-in-part of application Ser. No. 10/080,829, filed Feb. 22, 2002, now U.S. Pat. No. 6,783,459 which is a continuation-in-part of application Ser. No. 09/707,439 filed Nov. 6, 2000, now U.S. Pat. No. 6,554,705, which is a continuation-in-part of application Ser. No. 09/588,791 filed Jun. 6, 2000, now U.S. Pat. No. 6,234,900, which is a continuation-in-part of application Ser. No. 08/916,270 filed Aug. 22, 1997, now U.S. Pat. No. 6,142,876.

FIELD OF THE INVENTION

The present invention relates to passive biometric systems for identifying and tracking persons anonymously in a commercial or business environment.

BACKGROUND OF THE INVENTION

The possibilities for persons voluntarily and actively identifying themselves in commercial transactions are widely known and commercially available in many forms. Customers identify themselves for the purpose of affecting commercial transactions by means of personal identification numbers (PIN), magnetic cards, smart cards, and various biometric identification techniques. In general, these techniques are used when an individual desires to make his or her presence known by positive identification techniques to enable a desired goal, e.g., entry to a secure location, purchase of merchandise by credit, or obtaining funds from an ATM machine.

In the gaming industry, similar techniques have been used to enable a casino to track play of its players, enabling the casino to monitor frequent play and reward players with "comps" based on level of play. These rewards may be in the form of free room, food, and beverage, as well as free travel, merchandise, and the like. Player tracking systems using biometric identification techniques have been described in my prior application Ser. Nos. 08/916,270 and 09/588,791, more fully identified above, the disclosures of which are incorporated herein by reference.

Prior commercial customer tracking systems have generally commenced with the customer voluntarily registering at a registration location, and providing his or her name, address, and other identifying information, which may be photographic, an identifying number (such as Social Security number), or biometric information. Thereafter, the commercial establishment can identify the customer each time the customer enters a commercial zone. This is done by the customer voluntarily entering information, such as a credit card, smart card, or PIN, and providing a confirming identification by matching biometric information with information on file. In some cases, such as set forth in my prior applications, biometric identification may be confirmed by a match with library information without the customer actively entering a PIN, swiping a card, or otherwise actively identifying himself.

However, certain technological advances have now made it possible to consider the acquisition and maintenance of customer tracking information solely through acquisition of biometric identifying information, without a customer identifying himself to a commercial establishment in any manner whatsoever. First of all, the increasing accuracy of various biometric identification techniques, along with the greatly reduced cost of biometric identification systems, renders these systems more widely useful. In addition, the vastly decreased cost of computer processing power and memory enables the efficient storage of large volumes of information and the search of extremely large databases at extremely low cost. Together, these technological advances permit business establishments to track customers, or identify repeat visits from undesirable persons, without the identified persons having to take any action whatsoever to be tracked. The system can be linked by the establishment to other remote locations operated by the establishment.

According to the invention, a business can obtain identifying physical information on anonymous persons within their business environment. Identification can occur even without the customer knowing it can or did occur. This information can be stored in a file (a "Doe" file) in a central computer system, along with incidents of activity pertinent to those persons when within the business environment. Biometric identifying information is thereafter accumulated from each person entering the environment, and this information is compared with information within the various files in the library. This is done without active entry of any data relating to the customer at the time of the transaction by either the customer or establishment personnel.

If a matching identification is found, information with respect to the current commercial activity is entered into the file. If the frequency of matches, or the level of commercial activity, exceeds a predetermined level, management personnel are alerted. This enables management to actively seek to identify the highest and lowest frequency customers, acknowledging their past and/or continued activity with some action or enabling various amounts of reward for various levels of activity as management sees fit.

Information contained in the Doe file can include negative information, as well as helpful information, relating to a customer's activities. For example, the customer can be identified as a thief, or person who has bounced a check, or created a disturbance. In this case, appropriate management personnel, such as security, can be alerted.

The system of the invention is applicable to any commercial activity, such as a retail store identifying repeat customers, an airline frequent flyer, patron of a museum, or casino customer tracking activity. For convenience, the detailed description of the invention will be described with respect to a casino's ability to track customers of its gaming machines. The ability to track customers enables casinos to reward frequent players with comps and other benefits, in an effort to encourage customers to continue to play at their establishment.

SUMMARY OF THE INVENTION

A customer tracking system includes a biometric identification technique for passively identifying customers. Information from a passive biometric identification is sent to a central computer system, which searches a library of "Doe" files for matching biometric data.

If no match is found, the central computing system opens a new file in the Doe library containing the biometric data. If matching data are found in the file, information with respect to the customer's prior activity is retrieved from the file. If the information is negative with respect to this customer, e.g., the customer has a poor credit history or is disruptive, the central computing system alerts a predetermined appropriate management function, such as security.

If the information found in the matching file is not negative, the central computing system searches the file to determine if the frequency of prior customer contacts, or the level of prior customer activity, exceeds a predetermined level. If it does, the system notifies selected personnel to enable them to greet the customer and, if not previously done, identify the customer by name. In most cases, this is done by the processor sending information from the file to a terminal where the transaction is being processed. Any identification which is learned at this time is then entered into the customer's file. If the frequency of activity is less than the predetermined amount, the system simply stores information with respect to the most recent contact in the customer's file.

In order to keep the library from becoming overloaded with a large amount of information having minimal use, the system is programmed to periodically check each file to determine if a minimum number of matches has been obtained within a predetermined time. If there have been insufficient matches, indicating that continued tracking is unlikely to yield useful information, the file is purged. This enables an establishment to eliminate records of persons who are one-time, or infrequent, visitors, and therefore may not be sufficiently interesting for the business to track. Elimination of these useless files also simplifies the search technique, limiting the number of files that are required to be searched to those which have a reasonable possibility of containing valuable customer information. Conversely, if the system is being used to identify low-frequency matches, the high frequency files could be purged or archived.

BRIEF DESCRIPTION OF THE DRAWINGS

These and other features and advantages, will become better appreciated as the same become better understood with reference to the claims, specification and drawings wherein;

FIG. 5 is a flow chart showing an embodiment of the system illustrated in FIG. 4 in conjunction with a personal identification number (PIN).

DETAILED DESCRIPTION

Figure 4:
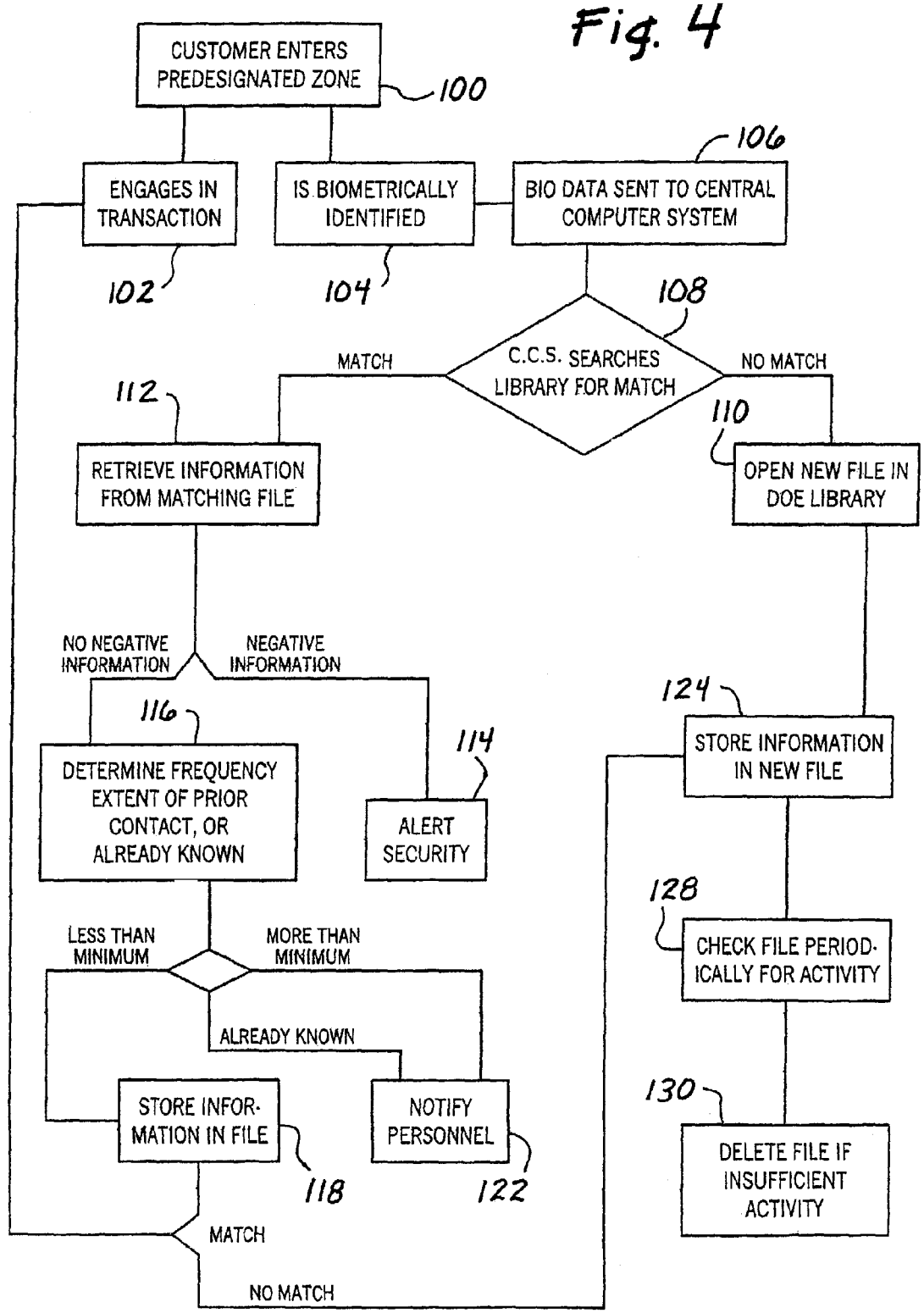
FIG. 4 is a flow chart showing an embodiment of the system whereby a customer can be tracked completely passively, without first registering with the establishment.

The basic operation of this embodiment of the invention is best seen in FIG. 4, which is a flow chart of the system. In the tracking system of the invention, a customer enters a predesignated zone, which may be a commercial zone, for the purpose of engaging in a transaction. The predesignated zone within a commercial area could be, e.g., the cash register or check-out area of a retail business, the entry area of a restaurant or night club, or a particular gaming area, such as a slot machine, video lottery terminal or pull-tab machine, within a casino. Upon entering the predesignated area, biometric information capable of positively identifying the customer is taken by the establishment by any known technical method. This information can be received without any positive action by the customer or by employees of the commercial establishment, such as entering a PIN number, swiping a card, pressing a fingerprint pad, or otherwise registering with the establishment.

There are many biometric identification techniques which can be done completely passively, including voice pattern recognition, retina scans, iris recognition, signature recognition, facial recognition, and others. Other techniques may involve some minimal activity on the part of the customer, such as providing a fingerprint, thumb print, hand geometry or topography, palm print, finger length, and others. All of these techniques for recognizing a person involving some biometric measurement are referred to herein as "biometric identification systems." All of these can be used without the necessity for a customer preregistering or performing any act specifically and purposefully for being recognized. The simple act of entering the space, or engaging in a transaction, would cause the system to commence the biometric identification process.

Once a customer enters a predesignated zone, 100, the customer is biometrically identified, 104, either prior, during, or immediately after, the customer engages in the commercial transaction, 102. The biometric identification system can be located in the vicinity of the commercial transaction, whether it be a cash register, slot machine, video lottery terminal, pull-tab machine, entry door, or the like. The biometric data taken at the point of purchase are then sent to a central computer system, 106. The central computer system comprises a series of files having stored biometric data from previous contacts with other customers. The files may be identified simply by number, where the identity of the person is not known (Doe files) or may include files for customers known by name, address, etc., as well as biometrically. The central computer system then searches its library of files for matching biometric data, 108.

If no matching biometric data are found in the computer library files, the computer opens a new file in its Doe library, identifying the file with an identification code or number, 110. Any desired information with respect to this customer contact is then stored in the new Doe file for future access. The information may include any information considered useful by management of the commercial establishment, such as the date, time of transaction, amount of purchase, or quantity of gaming play, etc.

If the computer finds a match for the biometric data of the customer conducting the transaction, the computer retrieves information, 112, from the matching file and processes the information as desired by management. For example, if the information retrieved from the file indicates that the individual is undesirable, the computer sends a signal to a security function to take action. This could be the case, for instance, if information in the file indicated that the customer had bounced a check, had credit problems, was a known undesirable, or for any other reason deemed important by the establishment, to alert management to make an immediate approach to the customer.

If the information found in the file does not contain any negative information, the file is then searched, 116, to determine the frequency of contact by the customer identified biometrically in this file, or whether or not the customer is in fact known already to the establishment by other identifying means (i.e., name, address, etc.). If the contact is less than the predetermined level for finding out more about the customer, the information is simply stored in the file, 118, for future access. If the customer is known, then personnel at the point of sale can be contacted to address the customer by name, or share any other information within the file with the customer as management sees fit. For example, a screen on the gaming machine could be programmed to address the customer by name, and the customer could then be allowed to access any information with respect to his frequent player card or account.

If the current contact from the customer elevates the number of contacts within the predetermined time period to exceed the minimum, then establishment personnel are so notified to take whatever action is deemed necessary, 122. For example, a gaming machine player who has had multiple recent contacts may be approached to find out if the customer would like to register for a frequent player rewards system. Alternatively, management may wish to offer the player certain comps or other potential benefits.

Information from the transaction, 102, is sent to the central computer system, 126, and is either stored in the identified player's file (if a match has been found with an existing file), or is stored in the new Doe file, 124, for future access in case the customer revisits the location in the near future.

The Doe files in the central computer system are periodically checked to determine if multiple contacts have been made within a period of time selected by management. In order to avoid maintenance of an excessive number of files for infrequent customers, all of the files are periodically checked, 128, for recent activity. If the activity does not exceed a certain amount predesignated by management, the files may be simply deleted, 130. If sufficient activity is found in the file, no action is taken.

While very precise, biometric identification techniques are not exact. Thus, more traditional identification techniques used in conjunction with the biometric identification techniques provide even more reliable identifications. More particularly, the use of a personal identification number (PIN) in conjunction with a biometric identification technique establishes a highly reliable identification system. Moreover, the system may utilize multiple biometric identification techniques and multiple traditional identification techniques in combination to form a nearly impenetrable identification net. For the sake of brevity, the remaining description refers to a PIN in combination with a facial identification technique. Additionally, a gaming machine is used to detail this particular embodiment of the invention but it understood that video lottery machines, pull-tab machines and the like can facilitate the invention.

Now referring to FIG. 5, shown is a flow chart illustrating a biometric identification system incorporating a PIN. The customer is biometrically identified, 204, either prior, during, or immediately after, the customer engages in the commercial transaction, 202 in a predesignated zone 200. In a generally simultaneous manner, the gaming machine requests that the customer select a PIN, 204. The gaming machine incorporates a means for the customer to input the PIN. Such means may be a series of selection buttons integrated into the gaming machine, touchscreen technology implemented in the gaming machine display or an independent hardware unit (e.g. keypad) adjacent, and in communication with, the tracking system. The gaming machine may also incorporate a display device for briefly displaying the PIN selected by the customer. Moreover, a printer device may print a ticket or voucher having the PIN depicted thereon. Therefore, the customer will have access to the recorded PIN when needed for future customer transactions.

The biometric data taken at the point of purchase are then sent to a central computer system along with the corresponding PIN, 206. The central computer system comprises a series of files having stored biometric data and PINs from previous contacts with other customers. The files may be identified simply by a number, where the identity of the person is not known (Doe files) or may include files for customers known by name, address, PIN, etc., as well as biometrically. The central computer system then searches its library of files for biometric data stored in a file associated with the selected PIN, 208. The central computer system then compares the biometric data associated with the PIN with the biometric data taken at the point of purchase. The inclusion of the PIN reduces the time for the central computer system to search the library of files. In other words, the search is now limited to that biometric data associated with the selected PIN. While it is understood that one or more customers may select the same PIN, the number of customers selecting the same PIN will always be much less than the number of stored biometric identities.

If no matching PIN is found in the computer library files, the computer opens a new file in its Doe library, identifying the file with the PIN, 210. For example, no matching PIN may be available in situations where the player is a first time player. Any desired information with respect to this customer contact is then stored in the new Doe file along with the PIN for future access. If the computer finds a match for the PIN and biometric data of the customer conducting the transaction, the computer retrieves information, 212, from the matching file and processes the information as desired by management.

If the information found in the file does not contain any negative information, the file is then searched, 216, to determine the frequency of contact by the customer identified by the PIN and biometrically in this file, or whether or not the customer is in fact known already to the establishment by other identifying means (i.e., name, address, etc.). If the contact is less than the predetermined level for finding out more about the customer, the information is simply stored in the file, 218, for future access.

If the current contact from the customer elevates the number of contacts within the predetermined time period to exceed the minimum, then establishment personnel are so notified to take whatever action is deemed necessary, 222.

As with the non-PIN system illustrated in FIG. 4, information from the transaction, 202, is sent to the central computer system, 226, and is either stored in the identified player's file (if a match has been found with an existing file), or is stored in the new Doe file, 224, for future access in case the customer revisits the location in the near future.

The Doe files in the central computer system are periodically checked to determine if multiple contacts have been made within a period of time selected by management. In order to avoid maintenance of an excessive number of files for infrequent customers, all of the files are periodically checked, 228, for recent activity. If the activity does not exceed a certain amount predesignated by management, the files may be simply deleted, 230. If sufficient activity is found in the file, no action is taken.

Although FIG. 5 details a player inputting a PIN at the gaming machine, it is also contemplated that the gaming machine may assign a PIN to the player. Once assigned, the PIN is stored with the biometric data of the player as set forth in regards to the selected PIN as detailed above.

Figure 1:
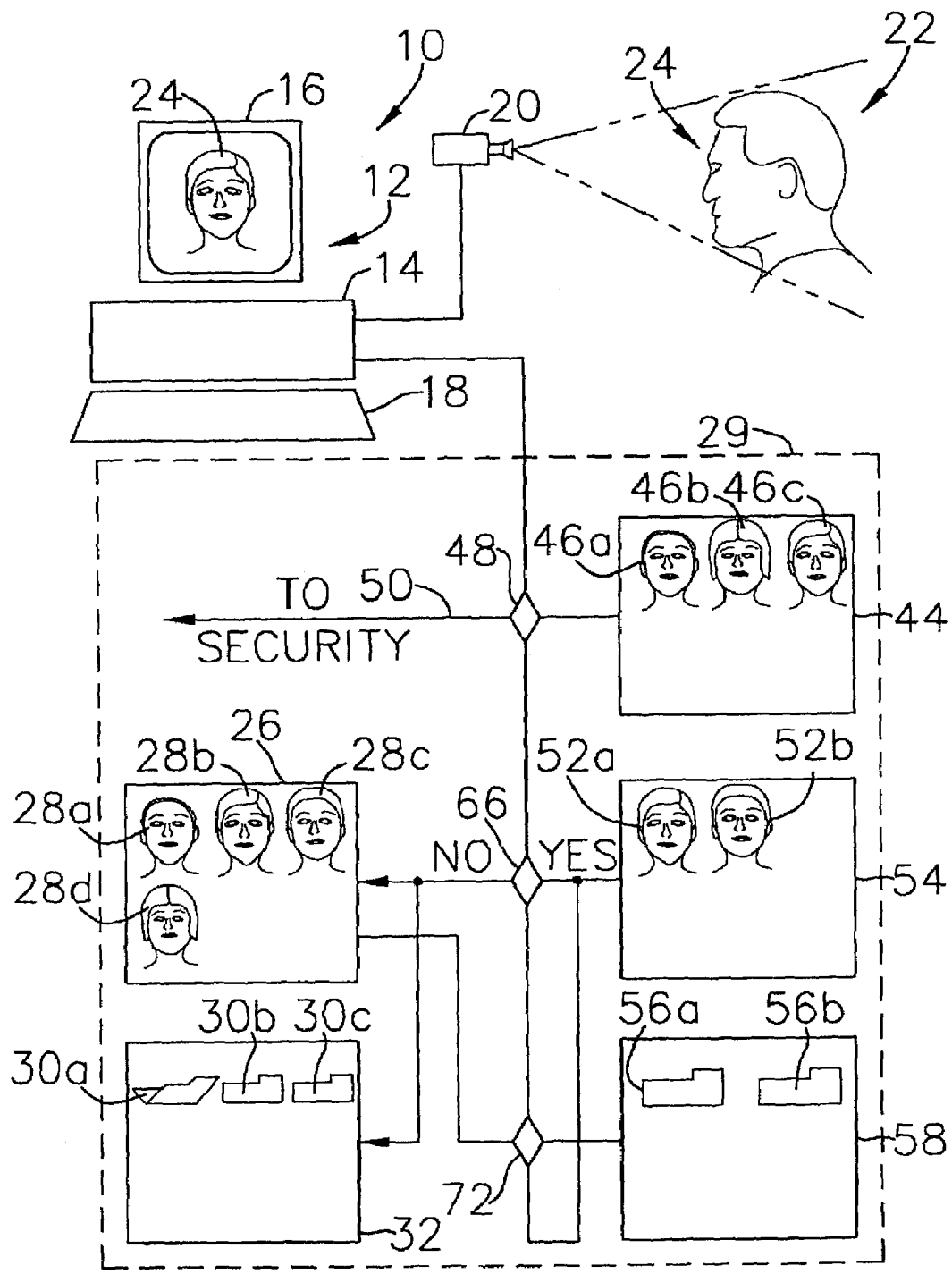
FIG. 1 is an illustration of the system and method of the present invention for persons to be signed up to the system.

Also, in a system whereby the player pre-registers for participation in the player-tracking system, as shown in FIG. 1, the player may select or be assigned a PIN immediately, even before play begins. The PIN is then stored along with the biometric facial data of the player in the FID library 26.

Biometric identification techniques are well known and are commercially available.

The development of biometric technologies for identification purposes is summarized in the January/February 2000 edition of ID World magazine. While in general, the accuracy of these techniques is increasing, and costs decreasing, as indicated earlier, a variety of factors must be considered when selecting a system for any specific use. While a centralized processing system will undoubtedly be available, a typical casino may include well in excess of 1,000 gaming machines. Each of these machines would be a candidate for the identification technique of the invention. Nonetheless, for reasons previously explained, the use of face recognition or iris recognition in the system of the invention is particularly preferred. Voice recognition is more difficult to implement accurately in a casino environment, which tends to have a high ambient background noise level, and also may be subject to persons carrying on normal conversations in close proximity to the various gaming machines. Currently, face recognition systems, such as Visionics' FaceIt NT and Miros' TrueFace are suitable biometric identifiers, although the rejection rate is somewhat high, and recognition can be impaired if a player is wearing sunglasses, etc.

There are numerous types of finger scanning systems which can be used in the invention. Fingerprint verification systems can use technology based on optical scanners or ultrasound. Some fingerprint sensors are chip-based, where users place their fingers directly on the silicon chips. Optical verification systems are manufactured by American Biometric Company, Identix, Indicator, BAC, FAC, and many others. An ultrasonic verification system is manufactured by Kodak under the name "UltraScan." Silicon chip-based vendors include Thomson-CSF, Infineon, SP Microelectronics, and others.

Face geometry technology acquires an image of a face from the distance of a few feet. Systems then analyze particular features, such as the distance between the eyes and the nose, and the shape and location of cheek bones. Face recognition systems are sold commercially by Visionics and Miros. Though relatively new for verification systems, current systems are designed to compensate for glasses, hats and beards and have the potential to be very accurate and cost-effective, operating with a standard off-the-shelf video camera.

Iris scan and retinal scanning technology is very accurate, and also suitable for use in the invention. Systems for scanning the iris can be obtained from IriScan. Retinal scan systems can be obtained from Eyedensity.

Figure 2:
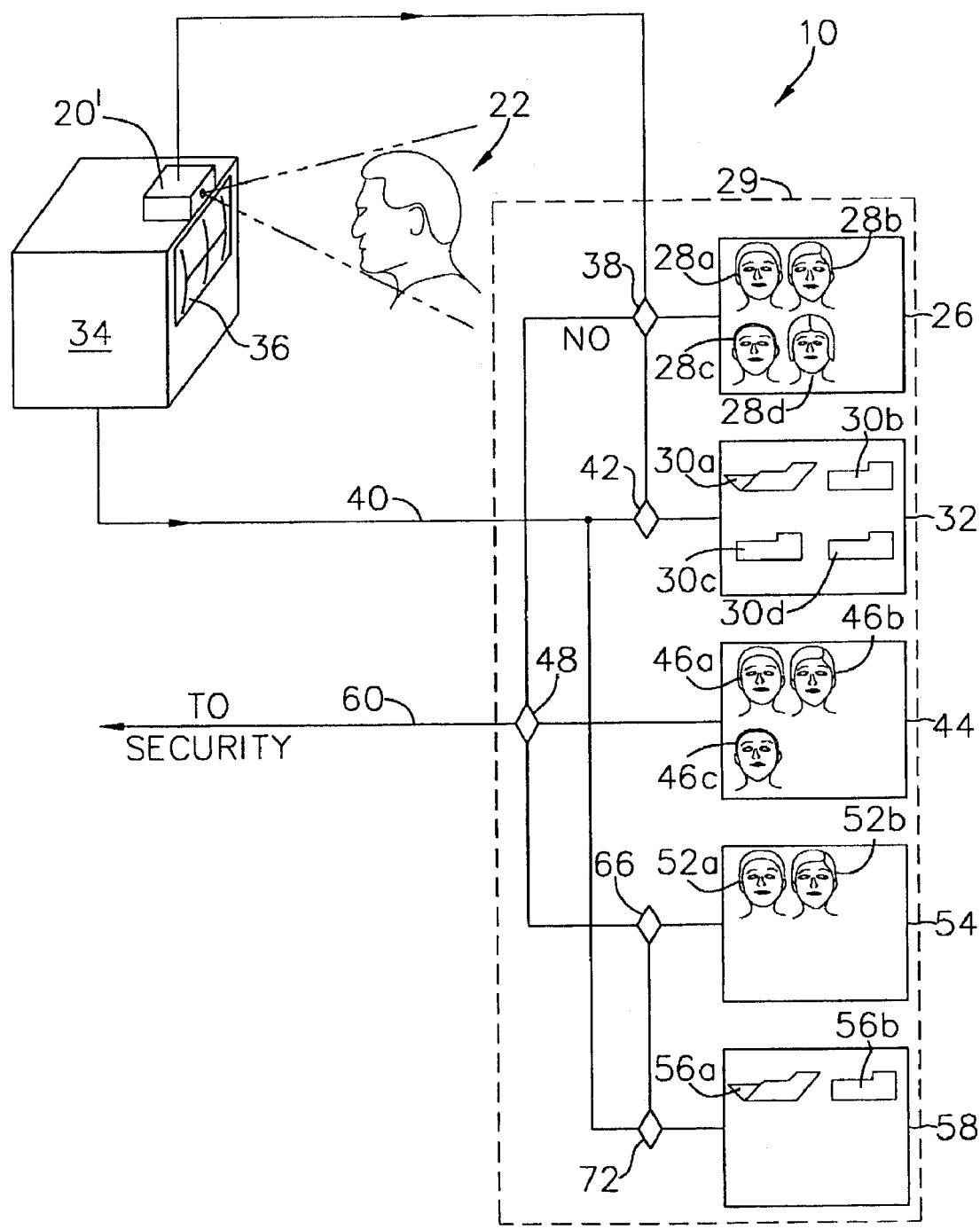
FIG. 2 is an illustration of one embodiment of the present invention for passive identification and tracking of player's play at a gaming device.
Figure 3:
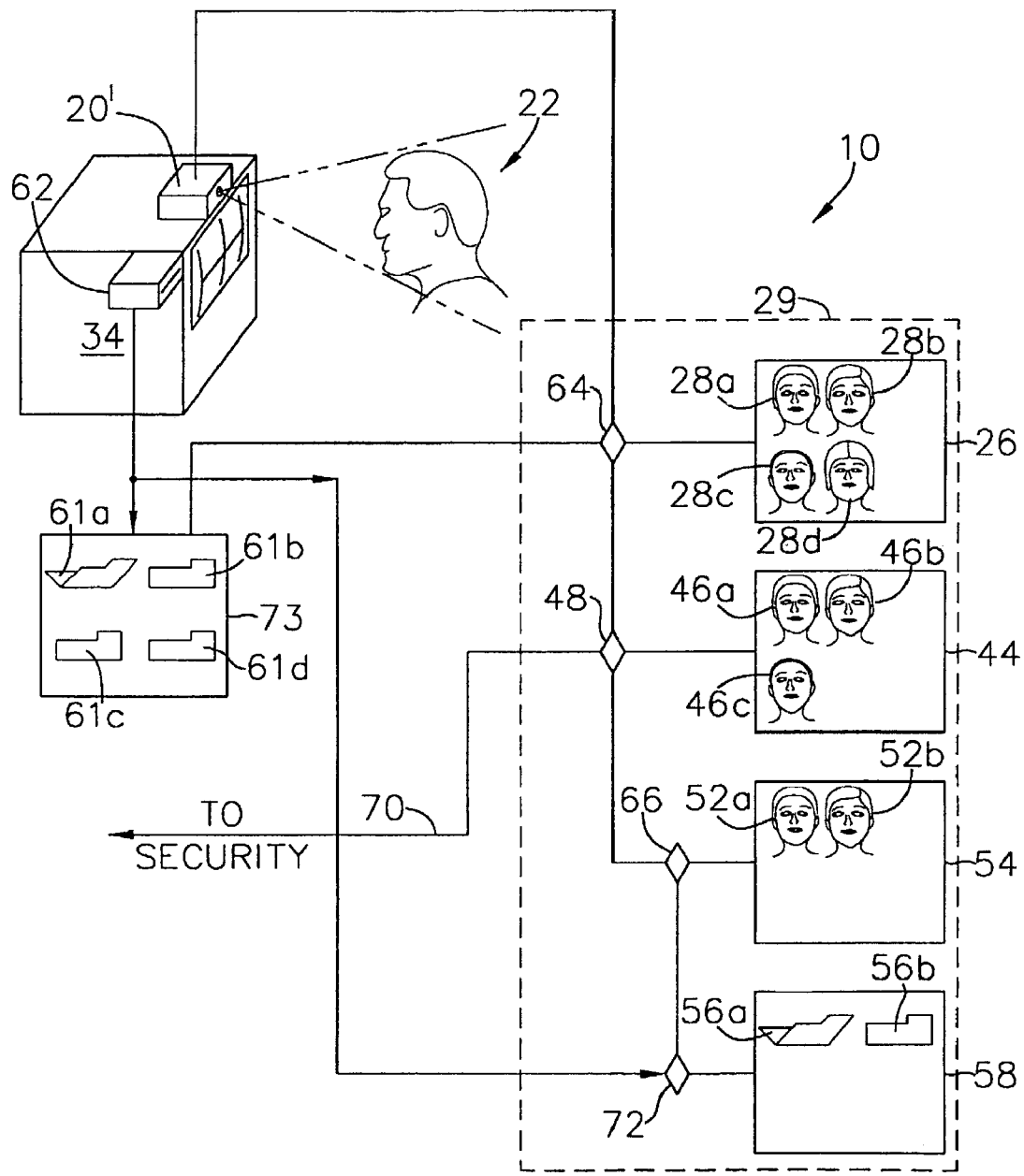
FIG. 3 is an illustration of yet another embodiment of the system and method for passive identification of a player and tracking of a parameter of play of a gaming device.

Other aspects and embodiments of the invention are shown in FIGS. 1–3, and can be used with any of the biometric identification techniques previously described. For convenience, the embodiments will be discussed with respect to a casino gaming tracking system, with a specific biometric identification technique being facial recognition.

Turning to the drawings, FIG. 1 illustrates the system and method according to the present invention for initially acquiring the digitized facial images of players for tracking play of the players while playing a gaming device or table game for the purposes of determining awards, promotions or comps to be given to the player based upon play. While the description as hereinafter set forth is directed to the player playing an electronic gaming device such as a slot machine, it is to be understood that it could be used as well with table games as long as the player is positioned such that a digitized image of the player's face can be acquired according to the present invention.

The system 10 includes a data entry station 12 including a processor 14 having therewith a display monitor 16 and data entry means such as a keyboard 18. The processor 14 may be any suitable personal computer and it should be understood that multiple stations 12 could be used to input and manipulate data according to the method and system of the present invention.

The system 10 includes means for acquiring a digitized image of one or more physically distinguishing features of a person. While the description as hereinafter set forth is directed to using the appearance of the persons' face as the distinguishing parameter, it should be understood that the persons retina or corneal profile could also be adopted as the physical feature as well as infrared profiles or the like. Sensor, Inc.'s IriScan identification system, which identifies a human being through the structural pattern of the iris is an example of an acceptable commercially available system. Further the system and method of the present invention could be based upon the consideration of several physical features, e.g. facial image and retina profile, to identify players. Thus it should be understood that the system merely requires the ability to passively acquire a physically distinguishable feature of a player. The term "passive" as used herein means that identification can take place without the individual taking a positive physical action to intentionally cause identification to occur, such as swiping a card in a card reader or placing a finger on a fingerprint reader. No invention is claimed in any specific technology for a passive identification method.

While any passive identification technique may be used in accordance with the invention, the invention will be described using full facial identification technology.

To acquire image data of the facial image of the player a digital camera 20 or a video camera may be used whose video image is processed to define a digitized image. While the camera 20 scans the person's face in the visible wavelengths of the electromagnetic spectra, other wavelengths could be used such as infrared or the like to obtain an identifiable image of the player. As illustrated in FIG. 1, a person 22 who wishes to have their play of games tracked poses and the image of their face 24 is acquired by the camera 20, processed and stored in a suitable data structure for purposes which will hereinafter become evident. The acquired image is displayed at the monitor display 16 and the attendant assures that a clear and correct image is obtained. The processor 14 processes the digital image of the person's face to obtain a gestalt facial image in the manner as suggested by Lambert U.S. Pat. No. 5,012,522 or to isolate or highlight data corresponding to unalterable features of the face 24 such as spacings between eye pupils, mouth shape, configuration of the eyes, nose and mouth. Preferably the processor 14 processes the digital image to form facial identification data representing substantially unalterable and unconcealable features of an individual's face whereby changes in hair color or style, growth of beards or a mustache or wearing glasses will not preclude identification of the individual. This data as shown in FIG. 1 is stored for each individual in a facial identification data (FID) library 26 of facial identification data entries illustrated as 28a–d maintained at a player tracking or host processor 29. It is to be understood that while only four facial identification data entries 28a–d are shown, that the FID library 26 would have any number of data entries depending upon the number of persons who wish to be entered into the system.

At the station 12, data is also input by using the keyboard 18 to identify the player by, for example, name and address of the player and signals are issued to open a player account file, for example, account file 30*a* at the host processor 29 which is stored in a suitable data structure hereinafter referred to as player account library 32. Each of the account files 30*a–d* corresponds to a facial identification data entry 28*a–d*.

With the FID library 26 and a player account file library 32 thus created in the host processor 29 data structure, the system 10 and method according to the present invention can be operated.

Turning to FIG. 2, to track a person's play at a gaming device 34 shown as a slot machine, the person 22 sits in front of the device 34 in the manner suggested. A digital or video camera 20' is provided on or proximate to the gaming device 34 and is directed to acquire an image of the face of the person playing the device 34. Accordingly, the camera 20' may be mounted on the device 34 or may be incorporated therewith. As can be appreciated, since the device 34 has a game monitor 36, the person's face in playing the gaming device 34 will be in a range of positions in relation thereto suitable for acquisition of the player's facial image. At this time, the player may also be requested to input the previously selected or assigned PIN by using input means 37. The input means may include selection buttons integrated into the gaming machine, touchscreen technology implemented in the gaming machine display or an independent hardware unit such as a keypad. Alternatively, if the player did not pre-register for player tracking, the player may be requested to select a PIN or may be assigned a PIN. The PIN may be displayed on the game monitor 36 or other display device or enunciated by an incorporated speaker system to verify to the player the selected or assigned the PIN. In addition, a printer device 39 may print a ticket or voucher depicting the PIN for future reference by the player. PINs may also be assigned by casino floor personnel using a wired or wireless personal digital assistant (PDA). The PDA may also be used to associate player data (e.g. name, address, etc.) with the player biometric identity and the assigned PIN. In this manner, the floor personnel approaches players and assigns a PIN and enters player data for those players willing to participate in the player-tracking system.

The speaker system or visual display may also query the player as to whether the player wishes to opt out of the player-tracking system all together. In response to the query the player may use the selection buttons or other gaming machines interfaces to inform the tracking system of the player's decision.

The digital or video camera 20' acquires an image of the person's face and sends that signal to the host processor 29. The acquired image may be digitized or processed, as suggested in Lambert U.S. Pat. No. 5,012,522 to isolate the person's face from any background images. The host processor 29 at 38 compares the acquired digital image of the person's face to the facial identification data entries 28*a–d* stored in the FID library 26. As suggested in FIG. 2, if the acquired image substantially corresponds to a stored image entry, the identified player's account file, shown as account file 30*a*, is placed into an open condition to receive the parameter of play from the gaming device 34 being played by the player. A signal 40 is transmitted from the device 34 indicative of the desired parameter of play. As illustrated in FIG. 2, this desired parameter of play may be the wagers made by the player at the device 34. In a known manner, each time the player makes a wager at the device 34, a data signal is generated indicative of the amount of the wager. Thus, as a player inputs coins or tokens into the device 34 to play, signals 40 are issued to the host processor 29. The host processor 29 at 42 allocates the parameter of play, e.g.

wagers or portions thereof or points related to the amounts wagered (hereinafter referred to as points), to the opened data file 30*a* which has been opened for the identified player. In this fashion, data corresponding to the player's accrued points can be assigned to the identified players account file 30*a*.

As further can be appreciated, since the acquisition of the facial image data and comparison at 38 is adapted to compare data which is substantially unalterable, the correct allocation of points to the player's account file 30*a*–d is maintained. The system 10 and method according to the present invention passively acquires the user's facial image and in response to recognition of the player opens up the corresponding account file 30*a*–d to allocate points.

With continuing reference to FIGS. 1 and 2, the host processor 29 may also include a security file library 44 of stored facial identification data images 46*a*–*c* for persons such as known slot cheats or other undesirables. This data may be stored, as referred to above, in the host processor 29 data structure or may be acquired and accessed from an outside vendor such as a security service.

With reference to FIG. 1, when a person desires to be included into the system 10 for tracking of play, the system 10 at 48 compares the acquired facial identification data to the data stored in the security file library 44 to determine if the acquired image of the person corresponds to any of the facial identification data entry 46*a*–*c* stored in the security file library 44. If there is no correspondence, the facial identification data is stored in the manner described above and a corresponding account file is opened at the data structure. If there is a correspondence, a signal at 50 is sent to security who may then handle the situation by confirming whether or not the individual is an undesirable or slot cheat. If the person is not, the operator of the system 10 at the station 12 and more particularly by keyboard 18 can override the security signal to store the acquired facial identification data and open the account file.

Further with reference to FIG. 2, when a person plays a gaming device 34, if the person's acquired facial identification data does not correspond to facial identification data are stored in FID library 26, the acquired facial identification data are assigned a doe file entry 52*a*–b in a doe library 54 and the acquired facial identification data are stored in the manner described above with reference to the FID library 26. As can be appreciated, the doe library 54 of facial identification data, while shown as only including two doe data file entries 52*a*–b, can have any number. Furthermore, a corresponding doe account file 56*a*–b is opened in a doe account library 58 which receives the parameter data and stores the same in the manner described above. Hence, even though the person has not heretofore been identified as by agreeing to enter into the system to have their play tracked, a doe facial identification data file entry, for example entry 52*a*, for the person and a corresponding doe account file 56*a* are opened for the player. As this new "doe" player plays, the accrued points are allocated to the corresponding account file.

Hence forward, each time this "doe" player plays the gaming device 34 which is incorporated into the system 10, the system 10 compares the acquired facial image data to the facial identification data stored at FID library 26 and if no corresponding facial images are obtained, compares them to the facial identification data contained in the doe library 54. If a corresponding facial image doe file entry 52*a*–*b* is retrieved, the corresponding doe account file 56*a*–b is opened and the accrued points during play of the gaming device 34 is allocated to that file. Again, if the player is neither identified at the FID library 26 or at the doe facial identification library 54, the acquired facial image data are assigned a new doe facial identification data entry and corresponding doe account file. Thus, over time, a library of images can be obtained so that points can be allocated. Furthermore, when a "doe" player is detected, their corresponding account file can be interrogated and if deemed appropriate the person can be approached by personnel to determine if they would like to have personal identification data entered into the system 10 so that their accrued points can be allocated to a known individual.

With reference to FIG. 2, it is also shown that the system 10 can be used to determine whether or not the person playing the gaming device is potentially an undesirable or slot cheat. As shown, the acquired facial identification data as acquired by digital camera 20', if it does not correspond to facial identification data entered into the FID library 26, is tested against FID data stored in the security file library 44. If a correspondence occurs, a signal at 60 is sent to security so that they can monitor or otherwise handle the situation. If not, the facial identification data is processed in the manner described above. The system is also ideal for identifying known criminals, under-age players and compulsive or addicted players. The system allows the security to train a camera or multiple cameras on a single gaming machine to record the activities of the undesirable prior to security physically reaching the location. It is also possible for the security to disrupt the undesirable's gaming machine so as to prevent further play before security is able to physically reach the subject machine.

With reference to FIG. 3, the system 10 and method of the present invention is shown as being used with known player tracking systems. Like components bear the same reference numerals.

As shown, associated with the gaming device 34 is a card reader 62 of known construction by which a player inserts an identification card (not shown) issued in the traditional manner. Hence in the playing of the device 34, the player inserts their card and begins playing the device 34 whereby the insertion of the card opens up the corresponding player's tracking account file 61a–d in a tracking data structure 73, shown as data file 61a, and allocates the points accrued during play of the device 34 thereto. When the player leaves the device 34, and removes their card from the card reader 62, the player's tracking account file 61a is closed.

According to the system and method of the present invention, means are provided to acquire facial image data of the player playing the device 34. Accordingly, a digital or video camera 20' may be provided on the gaming device 34. The acquired image is compared at 64 to the identification data entries 28a–d of the FID library 26 to determine whether or not the acquired facial identification data correspond to stored facial identification data. If a concordance occurs, the host processor 29 confirms that this is the person who was issued the identification card and if so, opens the corresponding account file 61a. If not, as described above, the acquired image is compared at 48 against the library of images maintained in the security file library 44 to see if the person is a known undesirable or slot cheat. If so, a signal 70 is sent to security to address the situation. If not, the signal is compared at 66 with any previously acquired doe images and if so open up the corresponding doe account file in the manner described above. If no corresponding doe file is acquired, the facial identification image data are assigned at 66 and stored in a corresponding new doe account file which is opened and the points are allocated thereto.

As can be appreciated, the system and method according to the present invention enables players to have points accrued during gaming of the device 34 or for that matter a table game where facial images can be acquired, to the corresponding account data file whether or not the person has an identification card or not. Furthermore, the system provides a means to allocate acquired points to persons heretofore not identified by the system in dummy or doe files. With reference to the data representing the points accrued to a doe account 56a–b, should the person desire to join in the system 10, when they do so, with reference to FIG. 1, the system 10 compares the acquired image at 66 with doe image data entries 52a–b and if a corresponding image found, the accrued points are transferred at 72 to a now, player identified, account file 61a.

In the embodiment utilizing the PIN, the PIN is associated with the player's facial image data and stored therewith. Thus, future file searches are based on the selected or assigned PIN and seek to access only files having a corresponding PIN. Thus, the biometric identification process is simplified since only a limited number of stored files must be accessed and compared to the acquired facial data. This eliminates the need to compare obviously unrelated files thereby decreasing the time required to conduct the biometric comparison.

The embodiments disclosed herein provide ample security to allow players to access stored gaming credits at the machine or allows access to customer data at service points such as service counters, cashiers, restaurants, box office, hotel front desk and customer service kiosks.

The embodiments disclosed also allow the casino to track a player's cash transactions, namely to comply with cash transaction requirements such as those set forth in Nevada Gaming Regulation 6-A. The embodiments of the system disclosed herein if used at cash transaction area, such as cashier windows, the system can aggregate each player's cash transactions for immediate display to each cashier. Heretofore, players could approach different windows and deal with different cashiers thereby deceiving the casino and possibly causing the casino liability under gaming regulations. While I have shown and described certain embodiments of the present invention, it is to be understood that it is subject to many modifications and changes without departing from the spirit and scope of the claims presented herein.

I claim:

1. A method for identifying and tracking customers of an establishment who have not previously registered or identified themselves to the establishment, which comprises:

obtaining biometric identification information from the customer;

obtaining a personal identification number (PIN) related to the customer;

transmitting acquired biometric data and said PIN to a data processor memory;

maintaining a library of files of anonymous customers and their corresponding biometric identification data and associated PIN in the data processor memory;

said processor comparing the received PIN with stored identical PINs in the files of said library to determine if the acquired biometric data associated with the received PIN match stored biometric identification data associated with the stored identical PINs of anonymous customers;

if said received biometric data match stored identification data of a prior customer in said library, said processor storing in the memory of said customer's file that a repeat identification has been made;

if said received PIN and biometric data do not match a stored PIN and stored identification data of a prior customer in said library, said processor opening a new library file and storing said received PIN and biometric data in said new library file; and said processor storing in the memory of the customer's file information relating to the customer's current transaction.

2. The method of claim 1 wherein the customer is requested to select and input a PIN of the customer's choosing.

3. The method of claim 1 wherein the PIN is assigned to the customer.

4. The method of claim 1 wherein if the received PIN and biometric data match a stored PIN and stored biometric data in an existing library file, the processor retrieving information relating to prior activity of the customer from said library file and sending said information to a terminal in the location of the transaction.

5. The method of claim 1 wherein if the received biometric data match a stored PIN and stored biometric data in an existing library file, and the existing library file contains prior activity information regarding the customer which has been characterized as negative, said processor sending information relating to the transaction and relating to prior activity from the file to a predetermined destination.

6. The method of claim 5 wherein the processor sends information relating to prior activity only if said prior activity exceeds a predetermined level.

7. The method of claim 5 wherein the processor sends information to the terminal only if the prior activity is less than a second predetermined level.

8. The method of claim 1 wherein the processor periodically scans all library files, and deletes files wherein no match has been found within a predetermined minimum time period.

9. The method of claim 1 wherein the processor periodically scans all library files, and deletes files wherein the level of customer activity in the file is less than a minimum preselected level.

10. The method of claim 1 wherein the method is used for identifying and tracking the play of a player playing a wagering game, and information stored in the customer's file is used to track the frequency and level of play of the player.

11. The method of claim 1 also comprising maintaining a second library of files of known customers and their corresponding PIN and biometric identification data in the data processor memory, said processor comparing received PIN and biometric identification data with files of the library of anonymous customers and the second library of known customers.

12. The method of claim 1 wherein the biometric identification information relates to physical features of the customer's face.

13. The method of claim 1 wherein the biometric identification information is obtained by scanning an iris of the customer's eye.

14. An identification method for identifying and tracking the play of a player playing a wagering game comprising:

acquiring passively biometric identification information related to the player;

obtaining a personal identification number (PIN) related to the player;

transmitting the PIN and acquired biometric identification information to a data processor memory;

maintaining a library of files of anonymous players and their PIN and corresponding biometric identification information in the data processor memory;

said processor comparing the received PIN with stored identical PINs in the files of said library to determine if the acquired biometric data associated with the received PIN match stored biometric identification data associated with the stored identical PINs of anonymous players;

if said received biometric identification information matches stored identification information of a prior anonymous player in said library, said processor storing in the memory of said players file that a repeat identification has been made; and if said received biometric information does not match stored identification information of a prior player in said library, said processor opening a new anonymous file for said player and storing in the memory of said processor file biometric identification information of said player and at least one parameter of play of the identified game.

15. The method of claim 14 wherein if the received biometric identification information matches biometric identification information in a file of anonymous players, said processor retrieving information relating to prior activity from said library file and sending said information to a predetermined terminal.

16. The method of claim 14 wherein the processor sends information relating to prior activity only if said prior activity exceeds a predetermined level.

17. The method of claim 14 wherein the processor periodically scans all library files, and deletes files wherein no match has been found within a predetermined minimum period of time.

18. The method of claim 14 wherein the processor periodically scans all library files, and deletes files wherein the level of customer activity in the file is less than a minimum preselected level.

19. The method claim 14 further comprising maintaining a second library of files of known customers and their corresponding PIN and biometric identification information in the data processor memory, said processor comparing a received PIN and biometric information with the files of the library of anonymous players and the second library of known players.

20. The method of claim 14 wherein the biometric identification information relates to physical features of the customer's face.

21. The method of claim 14 wherein the biometric identification information is obtained by scanning an iris of the customer's eye.

22. A gaming machine comprising:

means for passively acquiring a player's biometric identification data; and means for transmitting the biometric identification data to a central computer system such that the central computer system compares the acquired biometric identification data to stored biometric identification data of anonymous players to determine whether a match has occurred; and wherein if said acquired biometric identification data do not match stored biometric identification data in a library of player files, said central computer system opening a new library file and storing the acquired biometric identification data in said new library file.

23. The gaming machine of claim 22 wherein if said acquired biometric identification data matches stored biometric identification data of a prior anonymous player in a library of files, a processor of said central computer system storing in memory of said player's file that a repeat identification has been made.

24. The gaming machine of claim 22 wherein the means for passively acquiring a player's biometric identification data is a camera which captures the facial features of the player.

25. The gaming machine of claim 22 wherein the means for passively acquiring a player's biometric identification data is a camera which scans the player's iris.

26. The gaming machine of claim 22 further comprising means for a player to select and input a PIN which the central computer system will associate with the acquired biometric identification data.

27. The gaming machine of claim 26 wherein the means for a player to select and input a PIN is a keypad in communication with the central computer system.

28. The gaming machine of claim 22 wherein the central computer system assigns the player a PIN.

29. The gaming machine of claim 22 wherein the acquired biometric identification data is used to track the players play of wagering games.

30. The gaming machine of claim 22 further comprising an audio output means for providing verbal communication with the player.

31. The gaming machine of claim 22 wherein the means for passively acquiring a player's biometric identification data is external to the machine.

32. The gaming machine of claim 22 wherein the means for passively acquiring a player's biometric identification data is internal to the machine.

33. A table wagering game comprising:

a table;

means for passively acquiring a players biometric identification data located in proximity to the table;

means for transmitting the biometric identification data to a central computer system such that the central computer system compares the acquired biometric identification data to stored biometric identification data of anonymous players to determine whether a match has occurred; and wherein if said acquired biometric identification data do not match stored biometric identification data, said central computer system opens a new library file and stores the acquired biometric identification data in said new library file.

34. The table wagering game of claim 33 wherein the acquired biometric identification data is used to track the player's play of wagering games.

35. The table wagering game of claim 33 further including means for the player to select a PIN to be associated with the acquired biometric identification data.

36. The table wagering game of claim 33 wherein the player is assigned a PIN to be associated with the acquired biometric identification data.

* * * * *